US006778888B2

(12) United States Patent
Cataldo et al.

(10) Patent No.: US 6,778,888 B2
(45) Date of Patent: Aug. 17, 2004

(54) METHOD AND SYSTEM FOR CAPTURING VEHICLE DATA USING AN RF TRANSMITTER

(75) Inventors: Anthony Joseph Cataldo, Clinton Township, MI (US); Terry Haggerty, Canton, MI (US); Henry Thomas Ubik, Grosse Pte. Park, MI (US); Mona Patel, Canton, MI (US); Tim Harrington, Los Gatos, CA (US); Tom Bacon, St. Clair, MI (US); Dave Wisherd, Sunnyvale, CA (US); Doug Bowman, Capitola, CA (US)

(73) Assignee: Ford Motor Company, Dearborn, MI (US)

( * ) Notice: Subject to any disclaimer, the term of this patent is extended or adjusted under 35 U.S.C. 154(b) by 17 days.

(21) Appl. No.: 10/064,961

(22) Filed: Sep. 4, 2002

(65) Prior Publication Data

US 2004/0044451 A1 Mar. 4, 2004

Related U.S. Application Data

(60) Provisional application No. 60/314,822, filed on Aug. 24, 2001.

(51) Int. Cl.[7] .................................................. G06F 7/00

(52) U.S. Cl. ............................................ 701/29; 701/32

(58) Field of Search .............................. 701/29, 32, 33, 701/35

(56) References Cited

U.S. PATENT DOCUMENTS 5,995,898 A * 11/1999 Tuttle ......................... 701/102
6,437,692 B1 * 8/2002 Petite et al. ................ 340/540

* cited by examiner

*Primary Examiner*—Yonel Beaulieu
(74) *Attorney, Agent, or Firm*—Frank A. MacKenzie

(57) ABSTRACT

A system (100) and method (10) for automated collection of data from a transportation vehicle (14) having a wireless transmitter (12) connected to a diagnostic service bus (16). The wireless transmitter (12) is in communication with a server (22) for processing and displaying the collected data.

15 Claims, 2 Drawing Sheets

METHOD AND SYSTEM FOR CAPTURING VEHICLE DATA USING AN RF TRANSMITTER

CROSS REFERENCE TO RELATED APPLICATIONS

The present invention is cross-referenced, and claims priority to Provisional Application No. 60/314,822 filed on Aug. 24, 2001. The present invention is also cross-referenced to application Ser. No. 10/064,964, entitled Automated Collection Of Vehicle Data filed concurrently herewith.

BACKGROUND OF INVENTION

The present invention relates to a transmitter for collecting data from a transportation vehicle and more particularly to collecting data in real time without manual intervention.

Many applications require the collection of data from a vehicle. Applications in the manufacturing and delivery processes, dealer service processes, rental processes, exporting, fleet processing and credit support are a few examples of the need for data collection.

The data may include, but is not limited to, information relative to a vehicle such as the Vehicle Identification Number, mileage, etc. Currently data collection techniques require either manual collection of data, or a direct electronic connection.

There is a need for a transmitter that will collect relevant data and provide for transmission of the collected data upon demand.

SUMMARY OF INVENTION

The present invention is a system and method for collecting data from a transportation vehicle and transmitting the collected data upon demand. A telemetry transmitter is mounted to the vehicle and is attached to a service bus by way of an electronic connector. The telemetry transmitter collects relevant data from the vehicle, including but not limited to, identification number, mileage, fuel level, battery charge level, etc. The transmitter communicates with a server, remotely located from the vehicle, where the data can be accessed upon demand.

It is an object of the present invention to accurately collect relevant data from a transportation vehicle. It is another object of the present invention to communicate the collected data to a remote server without manual intervention, or mechanical connection to the server, where the collected data can be retrieved.

Other advantages and features of the present invention will become apparent when viewed in light of the detailed description of the preferred embodiment when taken in conjunction with the attached drawings and appended claims.

DETAILED DESCRIPTION

Figure 1:
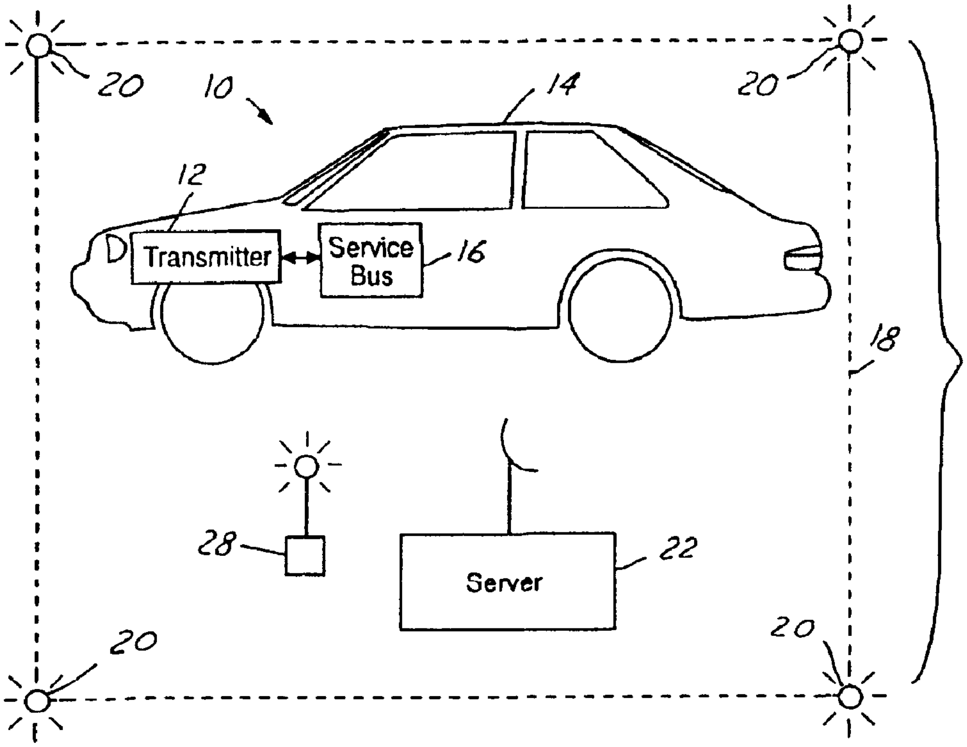
FIG. 1 is a block diagram of the system of the present invention.

Referring now to FIG. 1, there is shown a block diagram representing the system and method of data collection 10 according to the present invention. An active RF transmitter 12 is mounted to a transportation vehicle 14. The transmitter 12 is connected to a service bus 16, also on the vehicle 14 and is typically used as a port for diagnostic testing of the vehicle. A perimeter 18, or area, is defined by a plurality of wireless antennae 20.

The transmitter 12 has the capability, through software or otherwise, to collect relevant data from the vehicle by way of the service bus 16. The service bus 16 provides the transmitter 12 with the access necessary for collecting relevant information from the vehicle. The desired data has an address that can be accessed by the transmitter through the service plug 16. Typically, a vehicle manufacturer assigns codes to specific events that occur in the electronic infrastructure of the vehicle. These codes are used by the transmitter to access and retrieve the relevant data. The data is communicated to the server where it is translated into useful information.

Relevant data might be the vehicle identification number, the mileage of the vehicle, the battery charge level, the fuel level. It should be noted that other useful and relevant information may be collected and is dependent upon the specific needs for a particular application and a particular type of transportation vehicle. The transmitter 12, by way of the service bus 16, may be programmed to collect any data that is available through the service bus 16.

The transmitter 12 will communicate the data through wireless antennas 20 to a server 22 where the data is collected, and processed for retrieval. The server will initiate the retrieval of data through wireless communications with the transmitter 12. The data may be processed and presented in any form that is required for any number of applications through software, or other, manipulation of the transmitted data.

The transmitter 12 can be instructed to collect and deliver to the server 22 as long as the vehicle 14 is within the defined service area 18. The service area shown in FIG. 1 is a square perimeter 18 defined by the wireless antennas 20 for transmitting the data from the transmitter 12 to the server 18. It should be noted that this particular arrangement is shown for example purposes only and several variations can be realized without departing from the scope of this invention. For example, the perimeter need not be square and may be defined by more, or fewer, antennae.

While the transmitter 12 and the server 22 are in continuous communication with each other in real time, it is possible to vary this aspect without departing from the scope of the present invention. For example, in another embodiment of the present invention, a handheld antenna unit 28 may be used to communicate directly with the transmitter 12 and obtain information from a specific vehicle directly to the handheld antenna unit 28.

Figure 2:
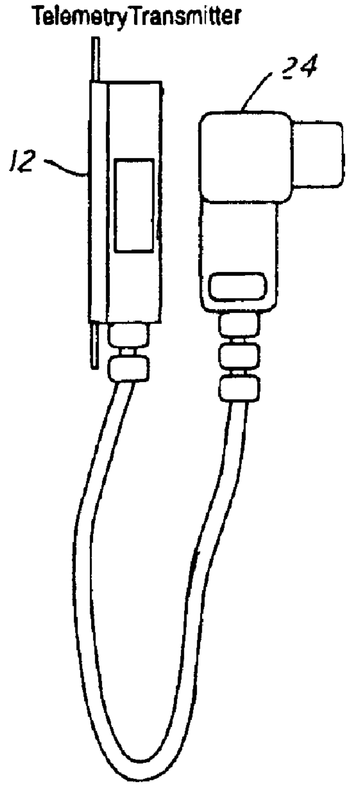
FIG. 2 is a side view of the telemetry transmitter used in the present invention.
Figure 3:
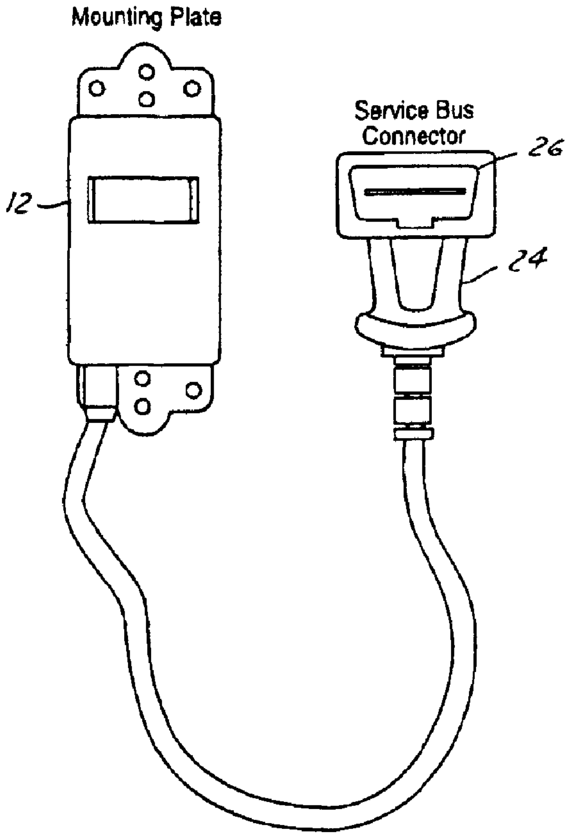
FIG. 3 is a front view of the telemetry transmitter used in the present invention.

FIGS. 2 and 3 show the RF transmitter 12 that may be used in accordance with the present invention. FIG. 2 is a side view of the transmitter 12, and also shows the connector 24 required for connection to the service bus 16 (not shown). FIG. 3 is a front view of the transmitter 12, also showing the connector 24 and a typical pin configuration 26 for mating to the service bus (not shown).

Figure 4:
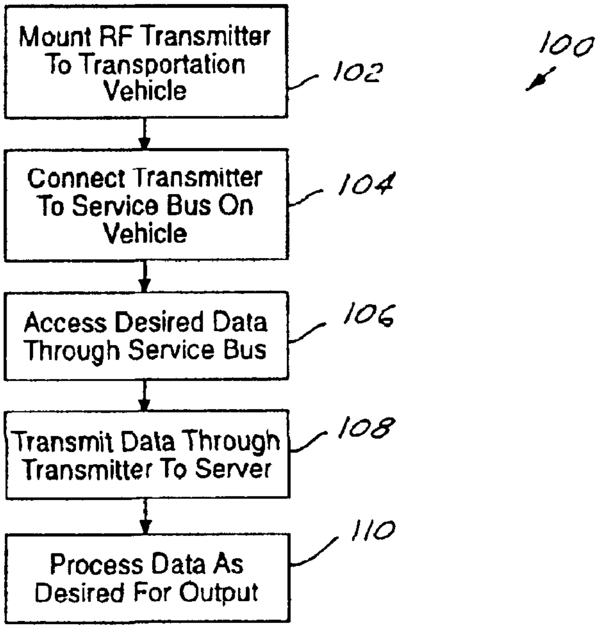
FIG. 4 is a flow chart of the method of the present invention.

The method 100 of the present invention is shown in FIG. 4. The method combines the transmitter, the diagnostic service bus and the software necessary for the communication among the transmitter, the service bus and the server to collect and communicate relevant data from the transportation vehicle. The present invention is completely automated in that it does not require any intervention to retrieve the data from the vehicle and communicate it to the server. The data can be transmitted to the server at a predefined distance from the location of the vehicle, eliminating the need for an individual to physically retrieve desired data from the vehicle.

The transmitter is mounted 102 to the vehicle and connected 104 to the service bus on the vehicle. The desired data is accessed 106 by the transmitter through the service bus, and transmitted 108 to the server. The server processes 110 the data and presents it in the output desired for the particular application.

The transmitter and the server are in continuous communication. However it is possible to communicate with a single transmitter using a handheld antenna unit. The handheld unit communicates directly with a particular transmitter and forces that particular transmitter to transmit to the handheld unit on demand. The handheld unit may be considered a portable server.

It is also possible, using the present invention to determine the location of a vehicle using the transmitter. The server is capable of calculating the location of a vehicle based on the arrival time of the signal from the transmitter on the vehicle to any antenna in the antenna network.

While particular embodiments of the invention have been shown and described, numerous variations and alternate embodiments will occur to those skilled in the art. Accordingly, it is intended that the invention be limited only in terms of the appended claims.

What is claimed is:

1. A system for collecting data from at least one transportation vehicle comprising:

a RF transmitter mounted to said at least one transportation vehicle;

a diagnostic service bus on said at least one transportation vehicle connected to said RF transmitter;

a server in wireless communication with said RF transmitter for initiating retrieval of data from said at least one transportation vehicle through said diagnostic service bus and for delivery of said retrieved data to said server, said server having commands for retrieving data having a predefined address corresponding to each of a vehicle identification number of said at least one transportation vehicle, a mileage of said at least one transportation vehicle, a battery charge level of said at least one transportation vehicle, a fuel level of said at least one transportation vehicle.

2. The system as claimed in claim 1 wherein said RF transmitter is a telemetry transmitter.

3. The system as claimed in claim 1 wherein said wireless communication is a wireless antenna network defining a predefined service area.

4. The system as claimed in claim 3 further comprising means for said server to determine a location of said at least one transportation vehicle within said predefined service area.

5. The system of claim 1 further comprising a handheld antenna that communicates with a specific transmitter for one of said at least one transportation vehicles on demand.

6. A method of collecting data from a transportation vehicle comprising the steps of:

mounting a RF transmitter to said vehicle;

connecting said RF transmitter to a diagnostic service bus on said vehicle;

accessing data representative of a vehicle identification number, a mileage, a battery charge level, and a fuel level by said transmitter through said diagnostic service bus;

transmitting said data to a server;

processing said data in said server to output as desired.

7. The method as claimed in claim 6 wherein said step of transmitting data to a server further comprises transmitting data to said server over a wireless antenna communication system.

8. The method as claimed in claim 7 wherein said wireless antenna communication system further defines a predefined service area.

9. The method as claimed in claim 8 wherein said step of transmitting said data further comprises transmitting a location of said vehicle within said predefined service area.

10. The method as claimed in claim 6 wherein said step of transmitting said data further comprises continuously transmitting data from said transmitter to said server for real time data.

11. The method as claimed in claim 6 wherein said step of transmitting said data further comprises forcing said transmitter to transmit data upon demand by way of a handheld antenna.

12. A method of collecting data from a transportation vehicle comprising the steps of:

mounting a RF transmitter to said vehicle; connecting said RF transmitter to a diagnostic service bus on said vehicle;

accessing a vehicle identification number, a mileage, a battery charge level, and a fuel level relevant to said vehicle by said transmitter through said diagnostic service bus;

transmitting said vehicle identification number, a mileage, a battery charge level and a fuel level to a server over a wireless communication network;

processing said vehicle identification number, mileage, battery charge level and fuel level in said server to output as desired.

13. The method as claimed in claim 12 further comprising the step of transmitting a location of said vehicle.

14. The method as claimed in claim 12 wherein said step of transmitting said data further comprises continuously transmitting data from said transmitter to said server for real time data.

15. The method as claimed in claim 12 wherein said step of transmitting said data further comprises forcing said transmitter to transmit data upon demand by way of a handheld antenna.

* * * * *